Aug. 13, 1935.    A. SCHACK    2,011,119
METHOD OF PROTECTING HEATING SURFACES AGAINST OVERHEATING
Filed May 11, 1933

Inventor
A. Schack.
by
W. E. Evans
Attorney.

Patented Aug. 13, 1935

2,011,119

UNITED STATES PATENT OFFICE 2,011,119

METHOD OF PROTECTING HEATING SURFACES AGAINST OVERHEATING

Alfred Schack, Dusseldorf-Oberkassel, Germany, assignor to Rekuperator Gesellschaft mit beschrankter Haftung, Dusseldorf, Germany Application May 11, 1933, Serial No. 670,504
In Germany December 3, 1932

2 Claims. (Cl. 257—225)

In recuperators and similar apparatus which operate at high temperatures, the coefficients of heat transmission of the stream of incoming furnace gas are exceptionally high; they are further considerably increased by the fact that the brickwork setting for the gas supply channel absorbs heat from the stream of gas and, acting in its turn as a secondary heating surface, radiates heat to the actual heating surface. Hitherto, to meet these conditions, it has been usual to cool with water or alternatively to feed cold air into the stream of gas (excess air). Neither method is however economical, for the thermal value of the hot water obtained is far below the thermal value of the hot combustion air, and in most furnace installations, particularly foundries, there is always more than enough hot cooling-water readily available. It is furthermore known that to introduce cold air into the furnace gas reduces the efficiency of the recuperator.

According to the invention a small auxiliary recuperator is provided in front of the main recuperator so that in that position the former very effectively screens the radiation from the gas supply channel from the adjacent parts of the main recuperator and at the same time lowers the temperature of the heating gases before they enter the main recuperator by abstraction of useful heat. Useful heat of which full use can be made is obtained in the auxiliary recuperator only when the temperature of the medium (hereinafter air alone is referred to) heated by the auxiliary recuperator is as high as, or higher than the temperature of the air heated by the main recuperator, for the lower the temperature the smaller is the value of the heat content. Consequently air, advantageously heated to an approximately equal or higher temperature than the hot air temperature of the main recuperator and the main hot air supply pipe, is supplied directly by the auxiliary recuperator.

One construction of apparatus according to the invention is diagrammatically illustrated in the accompanying drawing.

Figure 1:
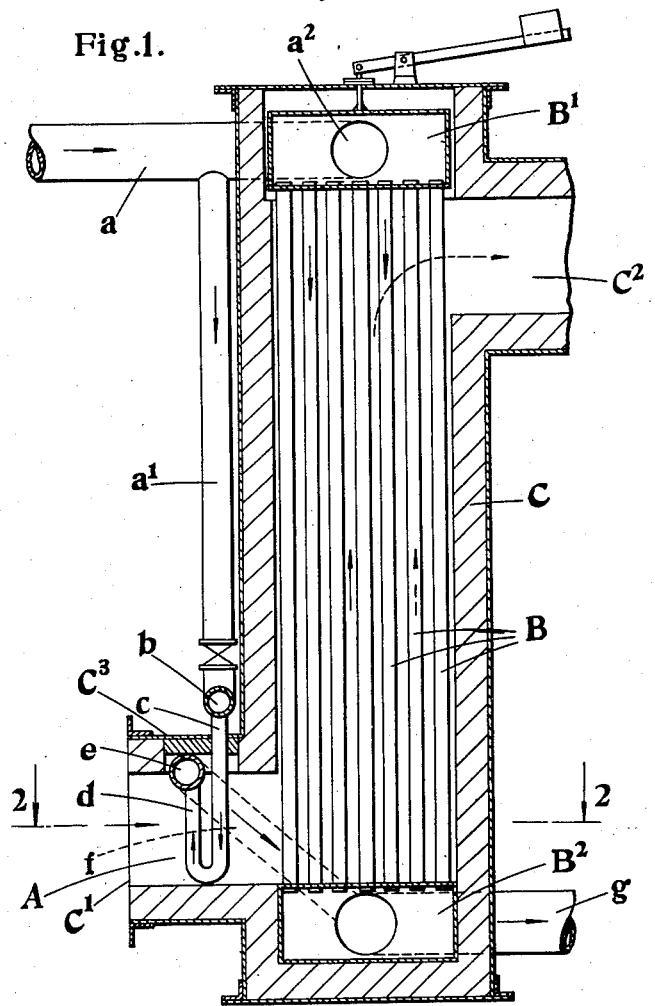
Figure 1 is a longitudinal section of a recuperator arrangement according to the invention.
Figure 2:
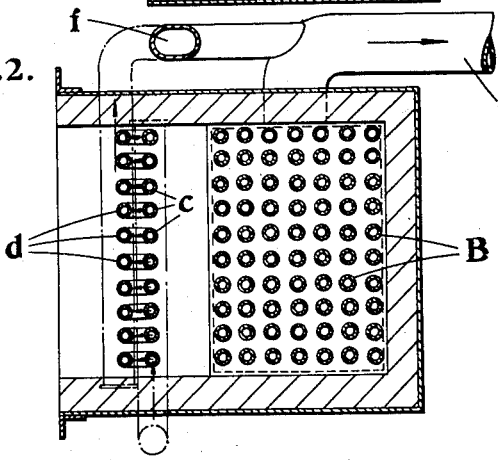
Figure 2 is a cross-sectional plan on the line 2—2 of Figure 1.

In the construction of recuperator arrangement represented in the drawing A is the auxiliary recuperator, B the main recuperator that is to be protected. The recuperator B comprises a plurality of parallel tubes extending between boxlike headers or collecting boxes $B^1$, $B^2$ and is set up in a brickwork setting C having an inlet passage $C^1$ for the heating gases and an outlet passage $C^2$ for the waste heating gases. The gaseous medium, such as air, to be heated is supplied to the upper header or collecting box $B^1$ by way of the conduit $a$ and through the inlet opening $a^2$, and the preheated air is discharged from the header or collecting box $B^2$ by the conduit $g$. The auxiliary recuperator A comprises a parallel series of highly refractory eye-tubes, that is to say, tubes presenting an open space shaped like the eye of a needle, each consisting of a length of tube bent into the form of a U, the two parts or shanks being constituted by the tube parts $c$, $d$. The parts $c$ are connected on the exterior of the setting to a header $b$ which in turn is connected to the supply conduit $a$ by a branch tube $a^1$ so that the gaseous medium is fed to the auxiliary recuperator in parallel with the supply to the main recuperator. The tube parts $d$ of the auxiliary recuperator are connected to a header $e$ which in turn on the exterior of the setting is connected by an exhaust tube $f$ to the conduit $g$. For convenience in mounting the auxiliary recuperator in position the setting is provided with a corresponding opening in the upper part of the brickwork forming the passage $C^1$, which opening is conveniently closed by a cover plate $C^3$ of suitable material.

The operation in actual working is as follows:
The whole of the air to be preheated comes through the conduit $a$. A small part of this air, say 10%, is branched off through the tube $a^1$ to the auxiliary recuperator. The remaining 90% passes through the inlet $a^2$ to the header $B^1$ of the main recuperator B and is preheated therein to a temperature of, for instance, 800° C. The preheated air leaves the main recuperator header $B^2$ by the outlet tube $g$ to be put to its determined use. The part of the air intended for the auxiliary recuperator passes through the tube $a^1$ into the distribution tube $b$ and subsequently through the separate shanks $c$ and $d$ of the eye-tubes into the hot-air collecting tube $e$ of the auxiliary recuperator. The pre-heated air then streams out of the hot air collecting tube $e$ into the main hot air outlet tube $g$ and is mixed there with the hot air from the main recuperator. The protection afforded the main recuperator B by the auxiliary recuperator A consists firstly in that the heat radiated by the gas flowing in the passage $C^1$ and by the brick setting forming the passage is absorbed by the auxiliary recuperator, only a very small portion of this radiated heat being transmitted to the main recuperator. Thus the auxiliary recuperator acts as a protective screen against the radiation of heat. Secondly, the temperature of the gas stream in the passage $C^1$ reaching the main recuperator is reduced by the abstraction of useful heat. Thirdly, the temperature of the first tubes of the tube-nest B is reduced directly, i. e. if the arrangement shown in Figure 1 is carried out. There the cold air enters the shanks or arms $c$ of the eye-tubes situated opposite the hottest part of the main recuperator. Due to the intense cooling effect of the cold air, the temperature of these tube parts $c$ is reduced, for instance, to 700° C. If, for instance, the temperature of the main recuperator tubes opposite the tubes $c$ is 950° C., considerable transmission of heat takes place in the opposite direction to that of the gas stream by radiation from the tubes of the main recuperator B to the tubes of the auxiliary recuperator A. The temperature of the hottest tubes of the main recuperator is thereby reduced without any reduction in the temperature of the incoming gases being effected.

The following measures, for instance, may be taken to protect the auxiliary recuperator proper from becoming overheated:

For the purpose of increasing the transmission of heat to the air passing through the recuperator, fillers for increasing the heat transmission may be positioned within the tubes. Further, the recuperators operate with a high velocity of the air, this being rendered possible by the fact that, in consequence of the parallel disposition of the main and auxiliary recuperators, the whole pressure difference which is absorbed by the long tubes (or other elements) of the main recuperator is also available for the short tubes of the auxiliary recuperator. The parts of the tubes are bent together as closely as possible in order to present to the external gases a relatively smaller surface for the transmission of the heat of the external gases than that acting for internal cooling purposes by reason of the shielding effect exercised by the parts of the tubes most exposed to the gases upon the parts of the tubes not so exposed. By bringing together or closely packing more than two tubes this effect can be heightened. As, however, the cooling action of the sections of the tubes which are shielded externally and not subjected to the intense heat of the gas is effected almost entirely by radiation of the heat absorbed from the tube sections subjected to the action of the gas, i. e. from the hotter sections, this arrangement is operative only for temperatures above approximately 500° C., for with temperatures below this figure the radiation would be of too small a value. Further, it is obviously of use only when the medium flowing through the tubes really permits radiation, for instance, when the medium is air, but not water. It may sometimes be an advantage to heat the air in the auxiliary recuperator to a temperature not so high as that of the air in the main recuperator; in such case to obtain a sufficiently high efficiency of the apparatus as a whole, it is essential that the air pre-heated by the auxiliary recuperator shall enter the main recuperator at a position where the temperature of the air is the same as that of the hot air in the auxiliary recuperator. It is important that the auxiliary recuperator shall be readily exchangeable, so that thus the whole recuperator is in two parts, one of which is exposed to a purposely heavy wear and so is made easily exchangeable, while the other, main, part is protected at the expense of the auxiliary part. In the arrangement illustrated this facility of exchange is provided for in that the disposition of the auxiliary recuperator and its parts permits of ready removal, for example, by disconnection of the pipe $a$ from the pipe $b$ and the removal of a small portion of the setting to release the tubes and the pipe $e$ and by disconnection of the pipe $e$ from the pipe $f$. The U-tubes may also be readily removable from connection with the pipes $b$ and $e$.

The invention is not limited in its essential features to the constructional form hereinbefore described since, for example, the auxiliary recuperator may be constructed otherwise than with U-shaped tubes.

I claim:

1. A method of protecting the parts of steel and similar recuperators that are exposed to the greatest heat, consisting in causing the stream of heating gas to impinge first upon an auxiliary metal recuperator of small capacity positioned across the path of the heating gas and adapted to extract heat from the heating gas, and then upon the main recuperator, and dividing the stream of gaseous medium to be heated into separate streams and causing the said separate streams to pass in parallel through the main recuperator and through the auxiliary recuperator, the gaseous medium passing through the auxiliary recuperator in a direction which ensures its entry into the auxiliary recuperator at that part which is most closely positioned with respect to the main recuperator for the purpose of securing the radiation of heat form the main recuperator to those parts of the auxiliary recuperator cooled by the incoming cold gaseous medium.

2. Recuperator apparatus comprising a tubular main recuperator consisting of inlet and outlet collecting boxes and tubular connections between the said boxes, a setting within which the said recuperator is positioned, said setting having an inlet passage for heating gases to be directed upon the tubes of the main recuperator, and an auxiliary recuperator provided with tubes of U-shape, the parts of which lie in close proximity and are disposed transversely to the path of the heating gases passing through the inlet passage of the setting in proximity to the main recuperator and screening the main recuperator from the first heat of the heating gases, the said auxiliary recuperator tubes being connected in parallel to the air circuit of the main recuperator, and the air inlet of the auxiliary recuperator tubes being in close proximity to the tubes of the main recuperator.

ALFRED SCHACK.